United States Patent
Pathak

(10) Patent No.: US 11,587,555 B1
(45) Date of Patent: Feb. 21, 2023

(54) RECOGNIZING HAZARD EVENTS BASED ON SOUNDS OF IN-HOME ACTIVITIES

(71) Applicant: Verily Life Sciences LLC, Mountain View, CA (US)

(72) Inventor: Anupam Pathak, Los Altos Hills, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 651 days.

(21) Appl. No.: 16/578,227

(22) Filed: Sep. 20, 2019

Related U.S. Application Data

(60) Provisional application No. 62/736,933, filed on Sep. 26, 2018.

(51) Int. Cl.
| | |
|---|---|
| G08B 21/04 | (2006.01) |
| G10L 15/16 | (2006.01) |
| G06N 20/00 | (2019.01) |
| G06N 3/08 | (2023.01) |
| G08B 27/00 | (2006.01) |

(52) U.S. Cl.
CPC ........... *G10L 15/16* (2013.01); *G06N 3/08* (2013.01); *G06N 20/00* (2019.01); *G08B 21/0423* (2013.01); *G08B 27/005* (2013.01)

(58) Field of Classification Search
None
See application file for complete search history.

(56) References Cited

U.S. PATENT DOCUMENTS

| | | | | |
|---|---|---|---|---|
| 10,380,852 | B2 * | 8/2019 | Horling | G06F 3/167 |
| 11,043,090 | B1 * | 6/2021 | Ulen | H04R 3/005 |
| 2015/0170044 | A1 * | 6/2015 | Jin | G06F 16/686 |
| | | | | 707/769 |
| 2015/0364028 | A1 * | 12/2015 | Child | G08B 1/08 |
| | | | | 340/541 |
| 2016/0364963 | A1 * | 12/2016 | Matsuoka | G06V 10/40 |

(Continued)

OTHER PUBLICATIONS

Abdel-Hamid, Ossama , et al., "Exploring Convolutional Neural Network Structures and Optimization Techniques for Speech Recognition", Department of Computer Science and Engineering, York University, Toronto, Ontario, Canada, Microsoft Research, Redmond, WA USA;, Aug. 2013, 5 pages.

(Continued)

*Primary Examiner* — Nafiz E Hoque
(74) *Attorney, Agent, or Firm* — Perkins Coie LLP

(57) ABSTRACT

A disclosed method includes receiving at least an indication of audio data generated based on sound captured by a microphone of a monitoring device. A set of audio event labels are generated by processing the received audio data with a model that includes audio recognition patterns. Each audio event label is generated by matching an audio pattern in the received audio data with an audio pattern of the audio recognition patterns. The method further includes identifying a hazard event type occurring within a time window of the time period by processing the set of audio event labels with a hazard detection model. In response to detecting the hazard event type, a hazard alert is generated and at least an indication of the hazard alert is communicated to an electronic device other than the monitoring device, which is authorized to receive communications from the monitoring device.

25 Claims, 10 Drawing Sheets

(56) References Cited

U.S. PATENT DOCUMENTS

| | | | | |
|---|---|---|---|---|
| 2016/0379456 | A1* | 12/2016 | Nongpiur | G08B 13/1672 |
| | | | | 340/541 |
| 2017/0309142 | A1* | 10/2017 | Phillips | G05B 15/02 |
| 2019/0139565 | A1* | 5/2019 | Chang | G08B 13/1672 |
| 2021/0049881 | A1* | 2/2021 | Connell, II | G06F 16/61 |

OTHER PUBLICATIONS

Nassif, Ali Bou, et al., "Speech Recognition Using Deep Neural Networks: A Systematic Review", Digital Object Identifier 10.1109/ACCESS.2019.2896880; date of publication Feb. 1, 2019; vol. 7;, Feb. 1, 2019, 19143-19165.

Piczak, Karol J., "Environmental Sound Classification With Convolutional Neural Networks", Institute of Electronic Systems Warsaw University of Technology; 2015 IEEE International Workshop on Machine Learning for Signal Processing, Sep. 17-20, 2015, Boston, USA, Sep. 2015, 6 pages.

* cited by examiner

RECOGNIZING HAZARD EVENTS BASED ON SOUNDS OF IN-HOME ACTIVITIES

CROSS-REFERENCE TO RELATED APPLICATION

This application claims priority to U.S. provisional patent application Ser. No. 62/736,933, titled "Detecting Health Hazard Conditions Based on Patterns of Recognized Sounds of In-Home Activities," filed Sep. 26, 2018, which is incorporated by reference herein in its entirety.

TECHNICAL FIELD

The disclosed teachings generally relate to electronic systems for in-home monitoring of user activities. The disclosed teachings more particularly relate to techniques for identifying anomalous events such as health hazard conditions based on audio data of captured sounds produced by in-home activities.

BACKGROUND

Society includes people in different stages of life such as infancy, childhood, adolescence, adulthood, and old age. These are developmental phases, each with its own biological, psychological, and social characteristics, through which individuals pass over the course of their lives. At some stages of life, people may require more assistance from other people. For example, young children require help from adults to navigate through life and to perform basic functions at home. That is, children lack the cognitive and physical abilities to operate independently at home. Likewise, elderly or sick persons may struggle to live independently at home because they are susceptible to ailments that could require immediate assistance from others. For example, elderly people are susceptible to hazard events such as falling at home and will need help from a caregiver to aid in recovery.

The need for in-home assistance has grown dramatically. Specifically, the US, along with most developed countries in the world, is experiencing a shift in population age demographics. The amount of people over 65 years old is expected to nearly double in the next 10 to 15 years, and most (e.g., close to 90%) prefer to avoid the institutional setting of assisted-living or nursing homes. A reduction in the ability to perform daily living activities (e.g., loss of ability to feed, toilet, drive) typically prevents an individual from living at home without care and triggers the family decision to force the individual to move out of his or her home. This comes with great emotional as well as financial cost (e.g., on average $50,000-$60,000 per year at assisted-living homes).

Existing technologies facilitate elderly or handicapped individuals to continue living at home rather than move into an assisted-living residence. For example, a LIFE ALERT device is a pendant-shaped device that can be worn by an individual on a necklace or wristband. The device includes an automated dialer connected to a telephone line. As such, the device can initiate a rescue when a person experiences a health hazard event (e.g., falls and cannot get up) or has an emergency such as a break-in and the telephone handset is out of reach. To get quick assistance, the individual can simply press a button on the pendant to activate the automated dialer to connect with an emergency call center.

These types of systems have many shortcomings. Their effectiveness depends largely on whether individuals always wear the devices, which is unlikely. Also, the individual is burdened to manually activate the device when needing assistance, which is not possible if the user is unconscious due to a hazard event. Further, information communicated to emergency services may require the individual to consciously communicate specific circumstances. As such, individuals that could benefit from remaining at home lack a practical way to do so while remaining safe and connected to caregivers when needed.

BRIEF DESCRIPTION OF THE DRAWINGS

Various features and characteristics of the disclosed technology will become more apparent to those skilled in the art from a study of the Detailed Description in conjunction with the drawings. Embodiments of the disclosed technology are illustrated by way of example and not limitation in the drawings, in which like references indicate similar elements.

Figure 1:
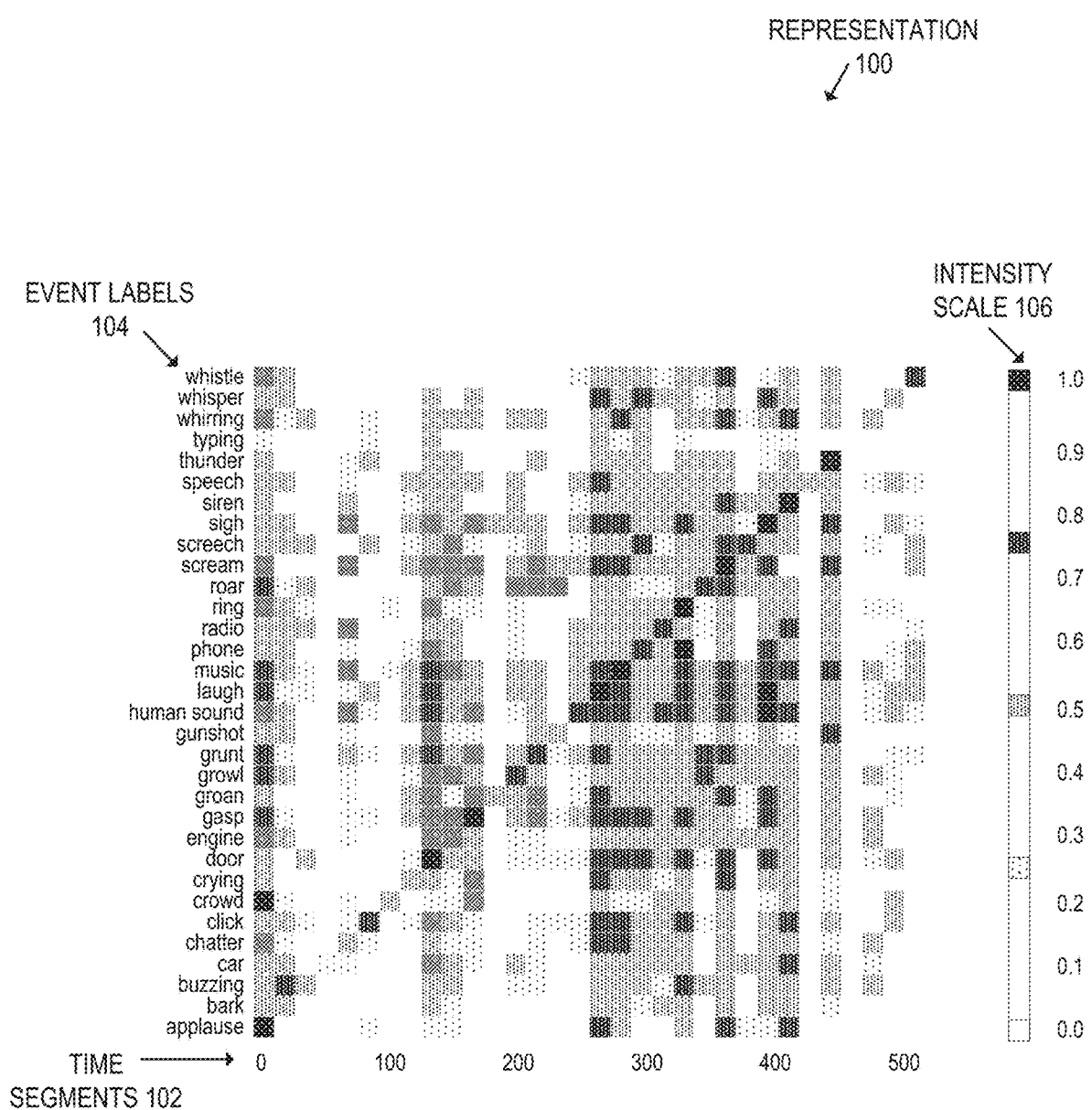
FIG. 1 is a multi-dimensional matrix representation of audio data.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

The embodiments set forth below represent necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of the terminology used herein is only for describing embodiments and is not intended to limit the scope of the disclosure. For example, reference to "one embodiment" or "an embodiment" means that a particular feature, structure, or characteristic described in connection with the embodiment is included in at least one embodiment of the disclosure. The appearances of the phrase "in one embodiment" in this disclosure are not necessarily all referring to the same embodiment, nor are separate or alternative embodiments necessarily mutually exclusive of other embodiments. Moreover, various features are described that may be exhibited by some embodiments and not by others. Similarly, various requirements are described that may be requirements for some embodiments and not for other embodiments.

As used herein, unless specifically stated otherwise, terms such as "processing," "computing," "calculating," "determining," "displaying," "generating," or the like, refer to actions or processes of an electronic device that manipulates and transforms data, represented as physical (electronic) quantities within the computer's memory or registers, into other data similarly represented as physical quantities within the device's memory, registers, or other such storage medium, transmission, or display devices.

When used in reference to a list of multiple items, the word "or" is intended to cover all of the following interpretations: any of the items in the list, all of the items in the list, and any combination of items in the list.

As used herein, a "hazard event" or similar term refers to an anomalous event (e.g., an unexpected event) that creates a hazard to a person. An anomalous event is usually determined as a deviation from a baseline of an expected event. An example is a health hazard event such as a slip and fall by an individual that requires medical assistance.

There is a desire to keep people with certain needs at home for as long as possible, both from a quality-of-life and a financial perspective. Examples include individuals with cognitive, physical, emotional, or behavioral difficulties. Emergency service devices, such as LIFE ALERT devices, burden users by requiring them to always wear the devices to fully experience the benefits of those devices. Solutions to these drawbacks include equipping homes with activity monitoring systems that can monitor an individual at home to capture events needing attention by others. Examples of activity monitoring systems include LIVELY or BEST BUY HOME8. These activity monitoring systems can connect security, safety, video, care, energy, and automation control under one system. The systems can offer collaborative video-verification, first-responder calling, secure video privacy and user control for priority emergency responses.

An activity monitoring system includes a network of devices that are distributed throughout an individual's home. Examples of network devices include door/window sensors, cameras, motion detectors, keychain remotes, and/or Internet of Things (IoT) devices. The activity monitoring system can log daily routines of an individual while at home. For example, a sensor can be attached to an individual's pillbox to detect whether medication is being accessed by the individual, and another sensor can be attached to a refrigerator to infer whether snacks and meals are being prepared by detecting the door of the refrigerator being opened or closed.

The network of devices are communicatively coupled to a central hub. The central hub can receive electronic signals over wireless or wired communications channels from each of the devices to collectively evaluate whether daily activities match expected routines. That information can then be shared with caregivers such as family members via an online dashboard through a secure login. For personal use, the user can authorize who can access the activity information. Unfortunately, these types of systems require complex and cost-prohibitive installation and maintenance of devices and sensors throughout an individual's home. Therefore, these solutions are cost-prohibitive and impractical.

The disclosed embodiments overcome the drawbacks of existing solutions. An embodiment includes a monitoring system with one or more devices or components thereof that can be positioned in one or more rooms or areas of a house. The system can monitor sounds of household activities occurring in different areas of the house. The system can generate audio data from the captured sounds, and then classify the audio data to generate a baseline of the individual's in-home activities as events and event types. The system can then identify an anomalous event (e.g., health hazard event) based on recognized in-home activities including the failure to detect an expected in-home activity relative to baseline activities. In addition, the monitoring system can classify and label sounds to distinguish between different anomalous events and can analyze a pattern of audio event labels to detect a hazard condition.

In some embodiments, numerous services can be integrated into a monitoring system to provide additional functions that support an individual's independent living. A system can include multiple devices that are placed in different rooms or areas of a house, to enable synchronized monitoring of an individual as they move throughout the house. In some embodiments, the monitoring system can support multiple individuals in the same house. That is, the monitoring system can distinguish between household activities of different individuals in the same house. When an anomalous event is detected, the monitoring system can communicate an indication of the anomalous event over a computer network and/or voice-based network to a caregiver. In some embodiments, the system can be setup, maintained, and modified with a mobile app on a handheld mobile device.

In some embodiments, the system has a reduced number of electronic components or only one component such as a single standalone monitoring device that is capable of monitoring in-home activities with sufficiently high fidelity to offer meaningful detection and identification of incidents. In other words, electronic component(s) can reliably recognize incidents of interest. In some embodiments, household activities are monitored by using a highly sensitive microphone that detects sounds in an individual's home. Audio data of the detected sounds is input to a computer system that is operable to recognize and distinguish different household activities from each other and to detect a pattern of sounds that are indicative of a hazard condition.

In some embodiments, the system can include an in-home monitoring device that captures sounds of physical activities including different types of physical events. The system produces audio data based on the captured sounds. For example, the audio data can be translated into a graphical representation. In some embodiments, the representation can be sent to a remote server over a computer network. The remote server can process the representation to identify an anomalous event based on a pattern of recognized and labelled audio signals indicative of physical activities. In this way, the privacy of the individual is maintained by processing the actual captured sounds locally and only communicating the representation of those sounds over the computer network. Although not shown nor described for the sake of brevity, the disclosed embodiments includes features that ensure compliance with privacy settings and data security.

Conventional computing resources lack the computational power to readily recognize physical activities based on sounds produced by the physical activities and captured by a computing resource. The disclosed embodiments overcome these drawbacks with a practical solution to accurately and efficiently differentiate between a variety of sounds of household activities. An anomalous event can be identified based on a pattern of recognized household activities of a variety of sounds. For example, identifying an unexpected event type or failing to identify an expected event type of an individual's usual routine may indicate an anomaly. An electronic notification of the detected anomalous event could be communicated to a caregiver of the individual by sending an electronic message to the caregiver's personal electronic device.

In some embodiments, the disclose system can implement one or more convolutional neural networks (CNNs) that yield significant improvements over prior approaches. The CNNs can be implemented to analyze an individual's routine activities and any anomalous events. CNNs can be used to recognize objects in images including faces and traffic signs. For example, a CNN can be implemented to recognize everyday objects in scenes and suggest relevant labels for recognizable objects. CNNs can also be effective in natural language processing tasks (e.g., sentence classification).

In some embodiments, CNNs are used to train/recognize audio data and/or train/learn patterns that user(s) exhibit during "normal activity." Comparing current activity to normal activity facilitates detecting anomalous activity. In some embodiments, for example, the output of a first CNN is a multi-dimensional matrix representation of audio event labels indicative of event activities. A second CNN could be used to analyze the pattern of event activities to identify an anomalous event. Note, however, that some embodiments can use techniques other than a CNN such as logistical regression, etc.

The architecture of a CNN includes an input layer and an output layer, as well as multiple hidden layers. The hidden layers may include convolutional layers, pooling layers, fully connected layers, and normalization layers. The architecture is designed to utilize a multi-dimensional data structure that represents audio signals indicative of sounds of physical activities. This can be achieved with local connections and weights followed by some form of pooling which results in translation invariant features.

In some embodiments, the convolutional layers apply a convolution operation to the input, passing the result to the next layer. A convolutional layer's parameters consist of a set of learnable filters (or kernels), which have a small receptive field, but can extend through the full depth of an input volume. During a forward pass, each filter is convolved across the width and height of the input volume, computing the dot product between the entries of the filter and the input and producing a multi-dimensional activation map of that filter. As a result, the network learns filters that activate when it detects some specific type of event at some spatial position in the input.

CNN design is analogous to vision processing in living organisms. For example, the convolution emulates the response of an individual neuron to visual stimuli, where each convolutional neuron processes data only for its receptive field. Although fully connected feedforward neural networks can be used to learn features as well as classify data, it is not necessarily practical to apply this architecture to graphical representations. A very large number of neurons would be necessary, even in a shallow architecture, due to the very large input sizes associated with images, where each pixel is a relevant variable. For example, a fully connected layer of an image of size 100×100 units has 10,000 weights for each node in the second layer. The convolution operation solves this problem because it reduces the number of free parameters, allowing the network to be deeper with fewer parameters. For example, regardless of image size, tiling regions of size 5×5 units, each with the same shared weights, requires only 25 learnable parameters. In this way, a CNN can resolve the vanishing or exploding gradients problem that occur when training traditional multi-layer neural networks with many layers by using backpropagation.

The pooling layers may include local or global pooling layers, which combine the outputs of node clusters at one layer into a single node in the next layer. For example, max pooling uses the maximum value from each of a cluster of nodes at the prior layer. Another example is average pooling, which uses the average value from each of a cluster of nodes at the prior layer.

The fully connected layers connect every node in one layer to every node in another layer. It is in principle the same as a multi-layer perceptron neural network (MLP). CNNs share weights in convolutional layers, which means that the same filter (i.e., weights bank) is used for each receptive field in the layer, which reduces memory footprint and improves performance.

The use of CNNs are also beneficial in that they are relatively easy to train in addition to having fewer parameters compared to fully connected networks with the same number of units. The performance of activity recognition based on captured sounds depends both on the machine learning framework and the amount of data used to train CNNs. As such, some embodiments utilize a training set that includes audio data sourced from numerous publicly available videos that include different sounds of different known devices and known in-home activities. For example, a training set can be sourced from videos on a video-sharing website (e.g., YOUTUBE) to significantly improve the performance of the disclosed in-home monitoring system.

FIG. 1 is a multi-dimensional matrix representation 100 of audio data from an audio file. The representation 100 reflects different types of events captured by a monitoring device. As shown, the horizontal axis is an array of continuous time segments 102 of a time period. The left-hand side vertical axis includes audio event labels 104 corresponding to "whistle," "whisper," "whirring," "typing," "thunder," and so on to "applause." The pixel intensity scale 106 on the right-hand side shows the possible intensity levels for any pixel in the representation 100, ranging from 0.0 to 1.0. The darkness of a pixel may correspond to a confidence level. Hence, each pixel represents the likelihood that an event-type occurred at a particular point in time. For example, the pixel corresponding to the "applause" label at time segment "0" has a relatively high intensity, which indicates a high confidence in the likelihood that the monitoring device captured an applause sound at the "0" time segment of the time period.

In operation, a classifier (e.g., classification model) can check each time segment, amplify that segment, analyze its frequency domain data within a timeframe/time period, and assign an event type label to that audio data. Hence, the output of the classifier can indicate the likelihood that a particular event type occurred, and a hazard event can be determined by analyzing a pattern of audio event labels for a timeframe. In some embodiments, detecting a hazard event requires analyzing contextual information and a historical profile of an environment rather than only analyzing a particular classification/label. Although the representation 100 has three dimensions (i.e., classification, time, and intensity), some embodiments may use fewer or more dimensions.

FIGS. 2A through 2D depict multi-dimensional matrix representations 200A-D of audio data that include events of different types. The horizontal axis is an array of continuous time segments 202 that range from 0 to 600. The representations 200A-D are outputs of a model (e.g., classification model) based on audio data input to the model. The audio data is generated based on sounds captured by a microphone of the monitoring device. The vertical axis includes the audio event labels 204 "whistle," "whisper," "whirring," "typing," "thunder," and so on to "applause." The intensity scale 206 on the right-hand side shows an intensity range from 0.0 to 1.0, where 0.0 indicates the lowest confidence of a classification of a labelled event type, and 1.0 indicates the highest confidence of a classification of an event type.

In operation, audio data captured by the monitoring device is processed and assigned one or more audio event labels indicative of an in-home activity. The audio event labels of time segments 202 are pixels that are assigned a weight ranging from 0.0 to 1.0. In some embodiments, the sum of the weights across all the audio event labels for a time segment is 1.0. In some embodiments, each audio event label could be associated with a weight that ranges from 0.0 to 1.0 such that the sum of the weights for all the audio event labels at any point in time is greater than the maximum value of any audio event label.

Figure 2A:
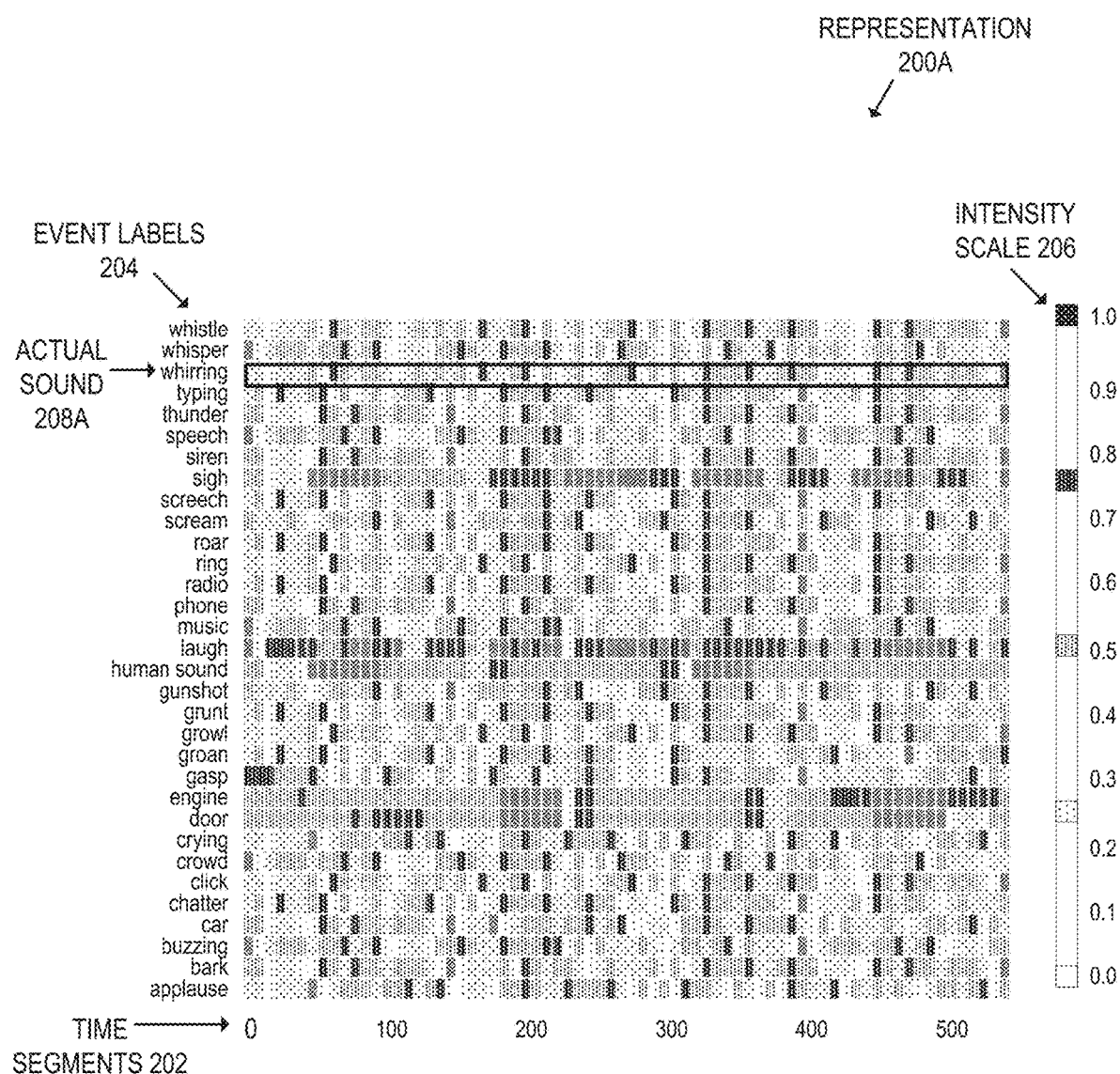
FIG. 2A is a multi-dimensional matrix representation of "whirring" sound that is mislabeled.

As shown in each of FIGS. 2A through 2D, a frame 208A-D shows actual sound captured in an audio file. The frame spans the time period for a particular audio event label. For example, FIG. 2A is a multi-dimensional matrix representation 200A of "whirring" audio data. The audio data is processed by a classifier that generates FIG. 2A. As shown, the pixels for the "sigh" and "laugh" audio event labels were assigned greater weights compared to the whirring audio event label during the same time periods. As such, FIG. 2A shows an output by a model that misclassified a whirring sound as sigh and laugh sounds.

Figure 2B:
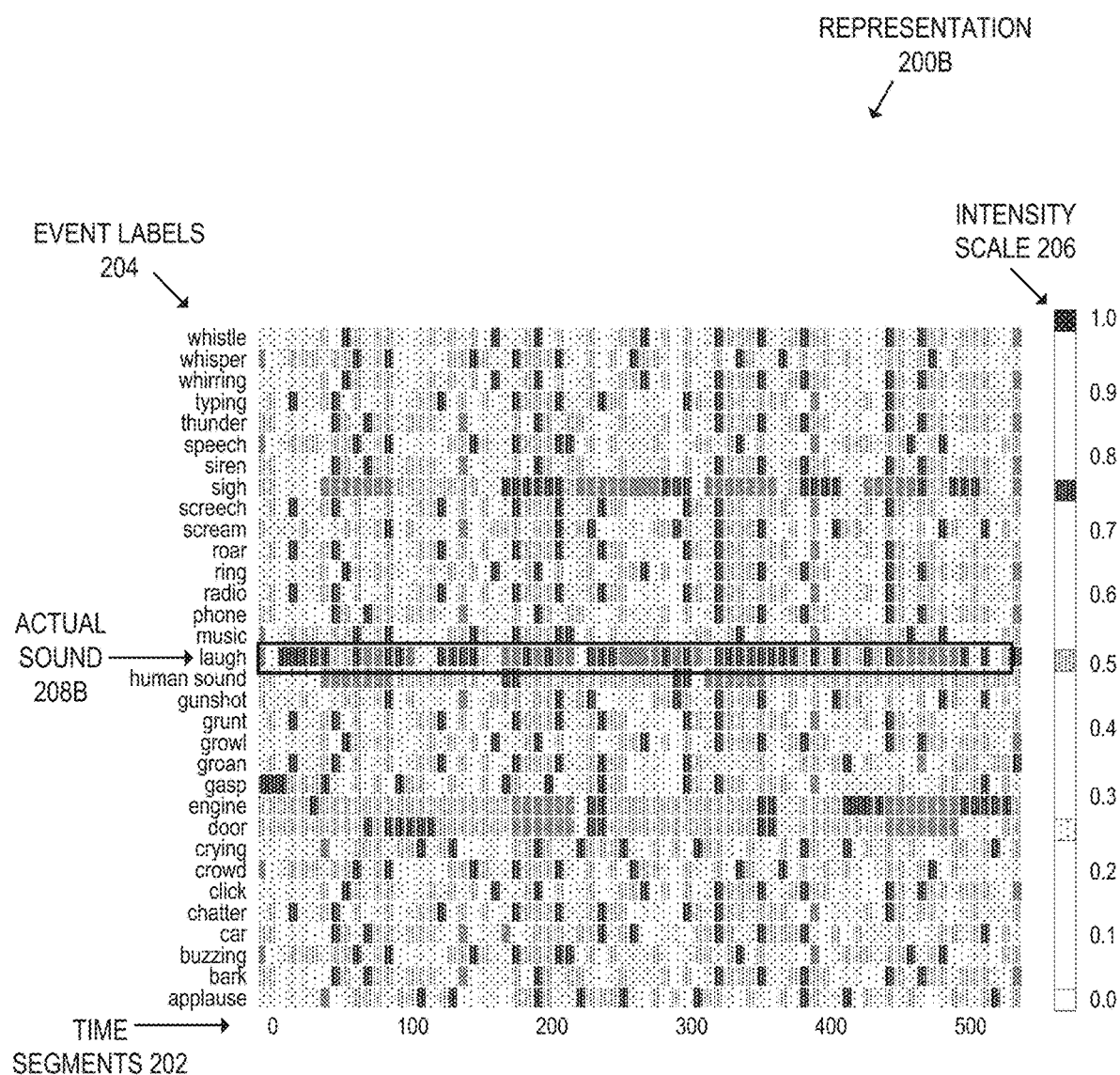
FIG. 2B is a multi-dimensional matrix representation of audio data correctly labeled as a "laugh" sound.
Figure 2C:
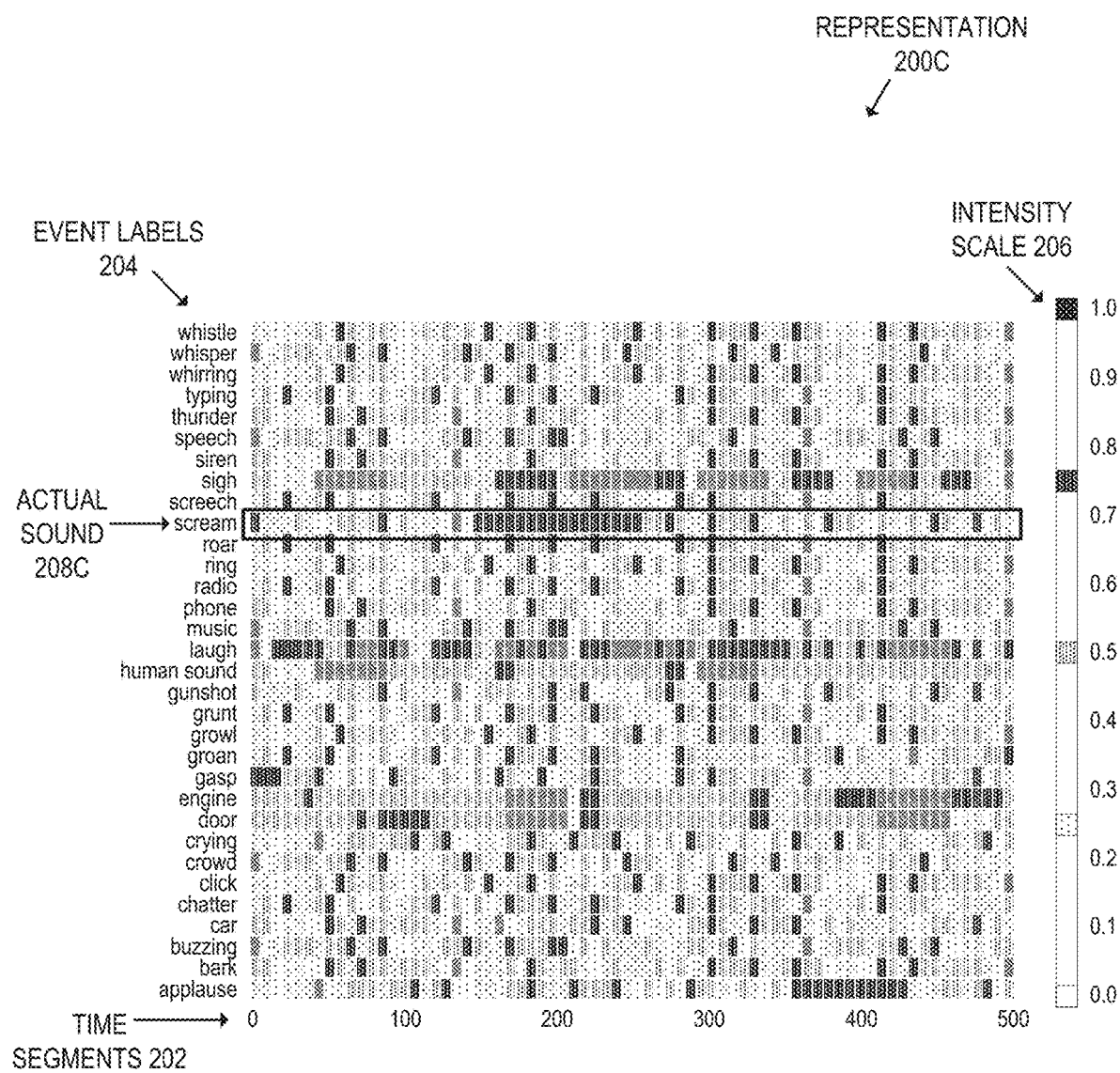
FIG. 2C is a multi-dimensional matrix representation of audio data correctly labeled as a "scream" sound.
Figure 2D:
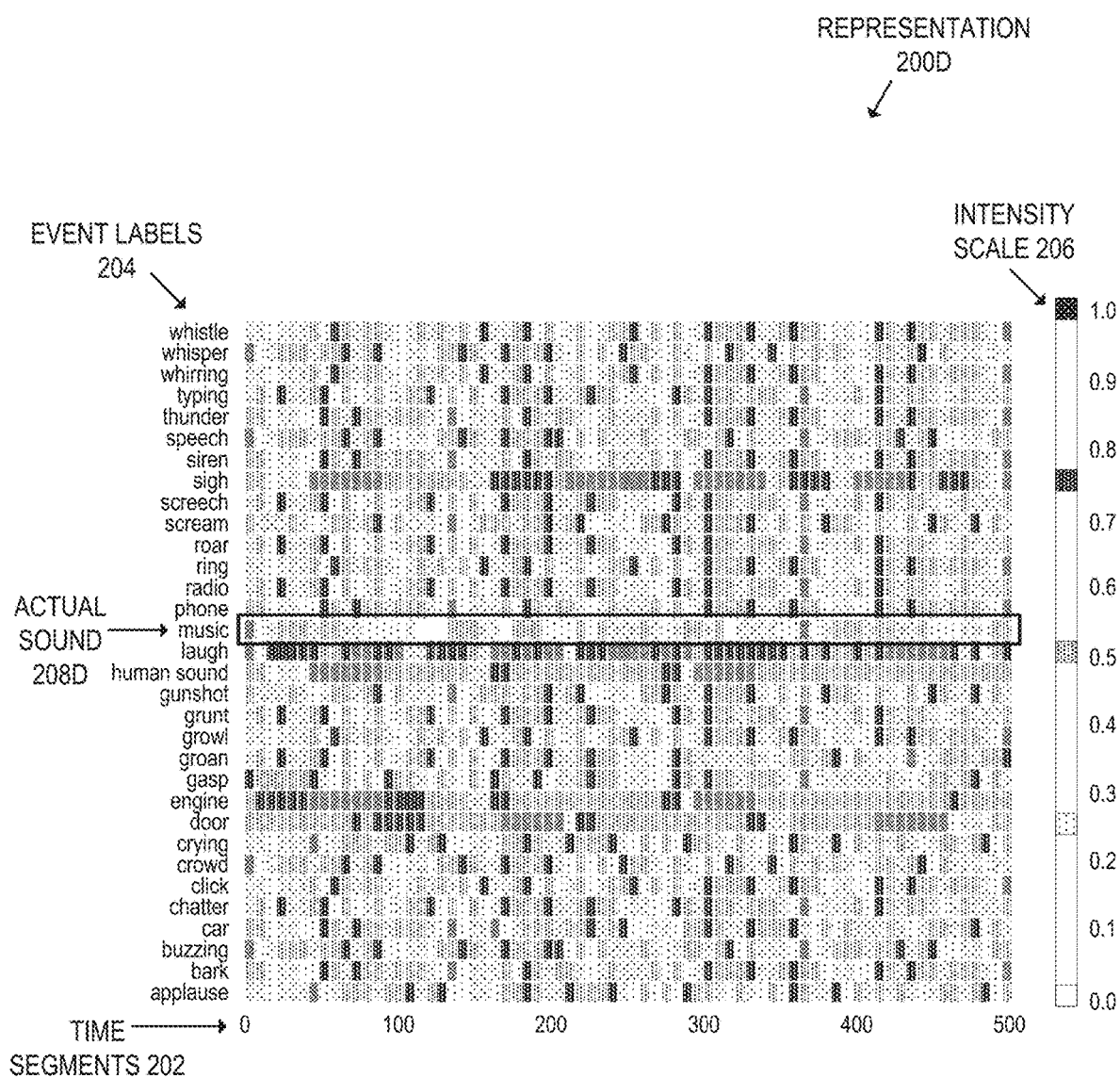
FIG. 2D is a multi-dimensional matrix representation of music sound that is mislabeled.

FIG. 2B is a multi-dimensional matrix representation 200B of audio data indicative of a "laugh" sound 208B. The audio data is processed by a model to generate FIG. 2A. As shown, the pixels for the laugh audio event label was assigned a greater weight compared to other audio event labels. As such, FIG. 2B shows an output by the model that correctly classified a laugh sound with a laugh audio event label. Likewise, FIG. 2C is a multi-dimensional matrix representation 200C of audio data indicative of a "scream" sound 208C that was correctly classified as such by a classifier. Note, however, that the classifier simultaneously misclassified the scream sound as an "applause" sound from about time 350 to 420. Lastly, FIG. 2D shows a multi-dimensional representation 200D that shows a misclassification of a "music" sound that is assigned "sigh," "laugh," "engine," etc., audio event labels.

As described in greater detail below, a hazard condition is detected based on a pattern of audio event labels that have been processed by a hazard detection model. For example, a pattern of audio event labels identified over a window of a period of time could be compared to a baseline pattern, which corresponds to a normal or expected pattern of audio event labels. The difference between the identified pattern and the baseline pattern is a detected anomaly of a hazard condition. As such, any mislabeled event may be inconsequential so long as the sounds are consistently mislabeled between the patterns.

A personal in-home model can be generated by capturing sounds from an individual's home for a period of time such as a day or week. In some embodiments, the classification model(s) includes audio data patterns that are trained from sourced videos and personalized by processing sounds collected from the individual's home to recognize routine sounds indicative of routine activities (e.g., opening a refrigerator, toasting bread) that occur at particular points in time of particular types of days (e.g., weekend, weekday). In some instances, a system includes a monitoring device that can be positioned in a selected room or area such as a kitchen or adjoining living room area. In these implementations, the monitoring device can detect and identify sounds of washing dishes, opening or closing doors, human speech, animal noises, etc.

Figure 3:
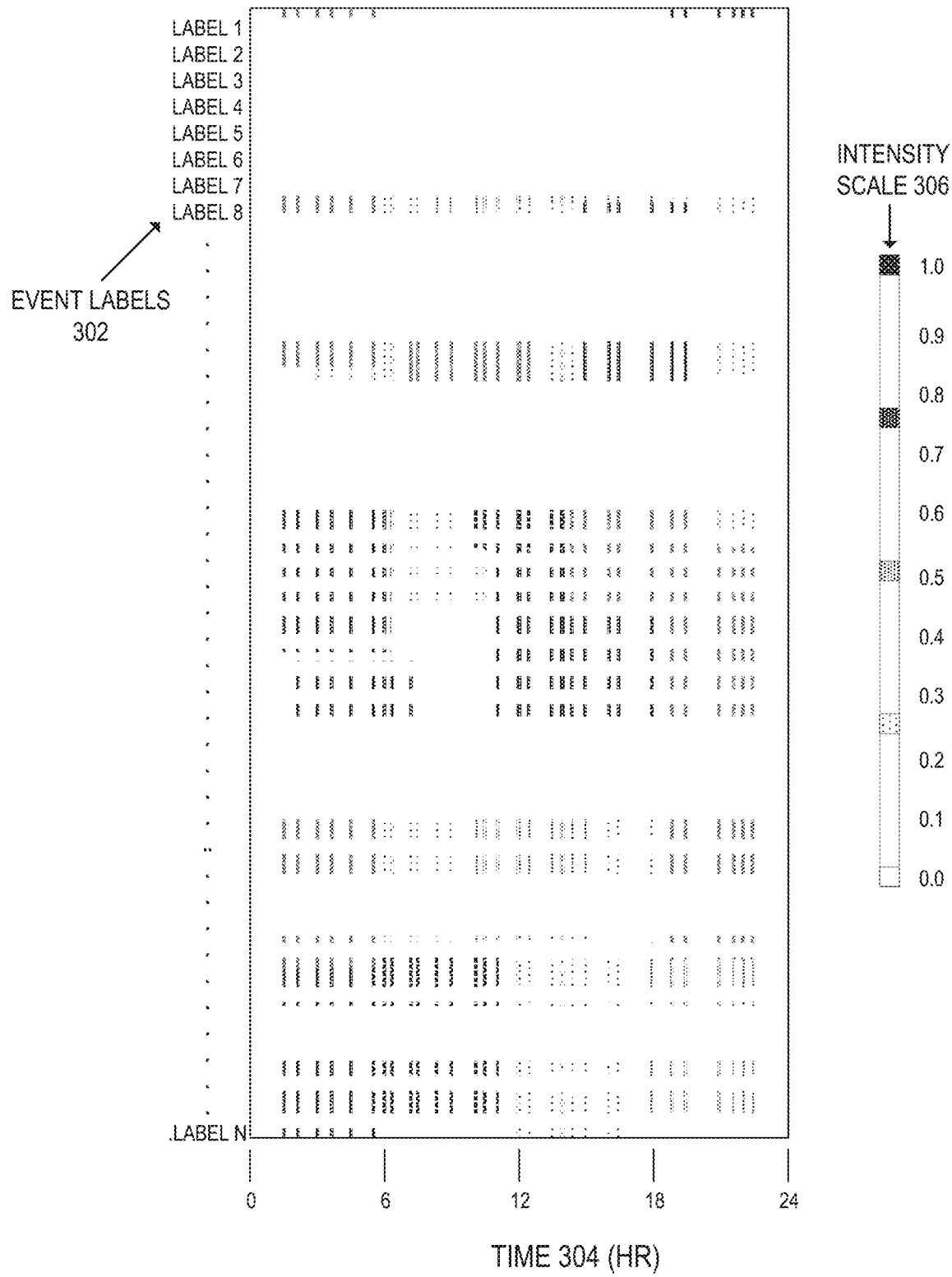
FIG. 3 depicts a spectrograph including numerous activations indicative of in-home activities occurring over a time period of a day.

In some embodiments, a classifier model can output numerous audio event labels for recognized event types. By running the model for an entire day, these audio event labels can be plotted over time to produce a representation of routine in-home activities. For example, FIG. 3 depicts a spectrograph 300 including numerous activations captured over a time period 304 of 24 hours. An "activation" may refer to one or more types of events produced from user activity or inactivity that is recognized in time segments and can be labeled. More specifically, the spectrograph 300 has N audio event labels 302 for activations that occurred over a period of a day. The points on the y-axis represent labelled activations, which can be grouped into speech related labels and household activity labels. The points on the x-axis represent points in a time period 304. The intensity scale 306 depicts the intensity of any activation where a darker shade is indicative of a sound detected with a greater intensity at a point in time. In some embodiments, the intensity is indicative of a probability or confidence that the activation is properly recognized.

That is, sounds of in-home activities can be depicted temporally to graphically represent specific activities (e.g., waking up, preparing breakfast, taking pets outside in the afternoon) in a room or area of a house at specific points in time. Further, the depicted spectrograph 300 could be used to train a CNN on different labeled days (e.g. weekday, weekend, day when individual is healthy, day when individual is sick). The resulting baseline data can be used to subsequently identify an anomalous event such as an unexpected activity or failure to detect an expected activity.

Figure 4:
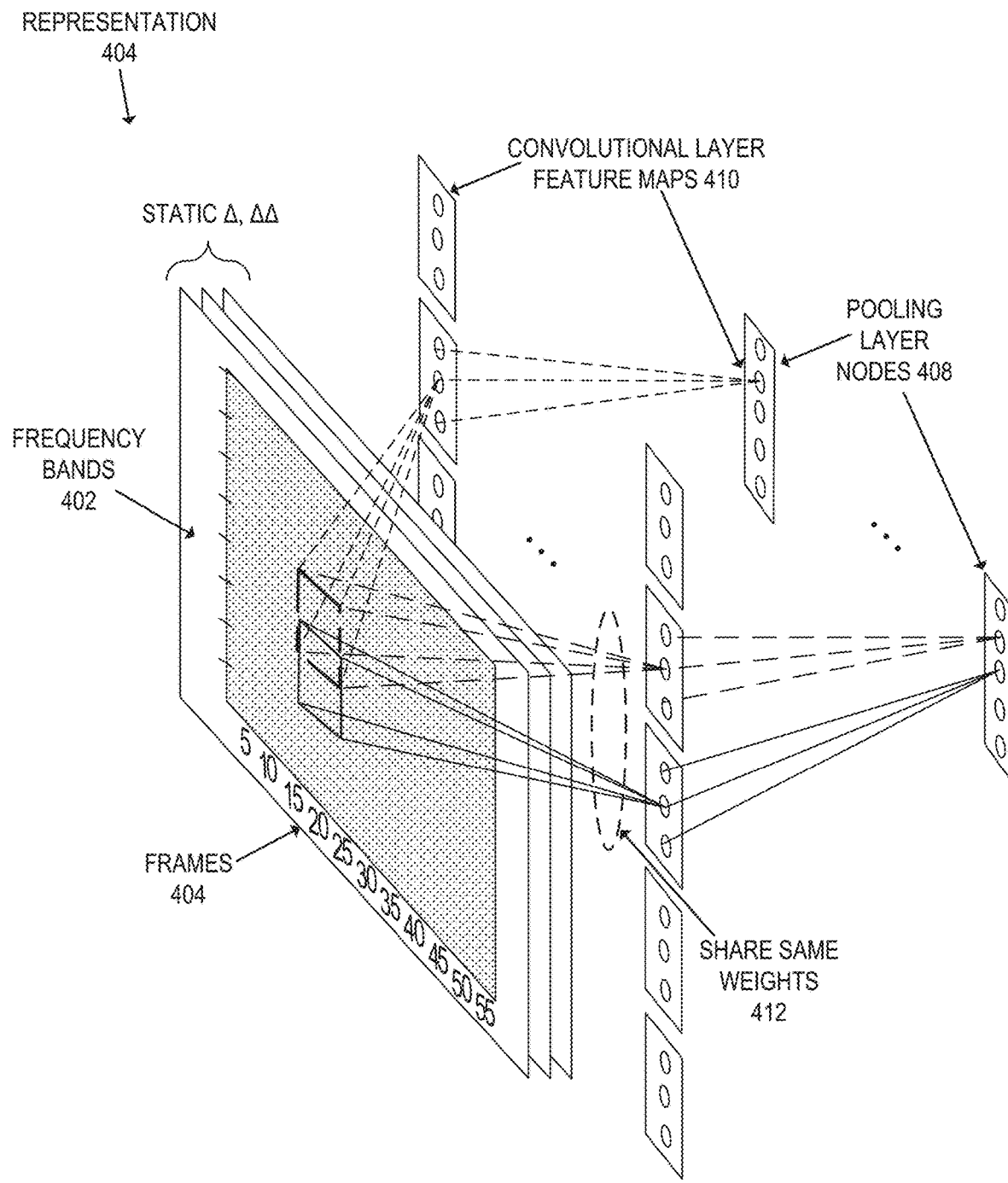
FIG. 4 depicts a convolutional neural network that can be used to analyze event types/patterns associated with user(s) to detect hazard events.

As described above, a CNN can reliably find patterns in representations 200A-D to recognize types of events in audio data. For example, FIG. 4 depicts a representation 400 of sound transposed into a frequency domain for each second. The vertical axis represents frequency bands 402 and the horizontal axis represents time. The frames 406 could be associated with different intensities or colors that are indicative of an amplitude that, when processed over an entire sound signal, will create the representation 404. Examples of sound signals can be fed into a CNN to assign audio event labels to audio data. Hence, this example shows how signals are broken down into small features, weights are applied to those features, adjusted, and tuned as a model gets trained on more and more data.

Accordingly, audio signals are transformed to a frequency domain and fed into a multi-layered CNN. Convolution-pooling pairs are stacked up to obtain higher level features, on top of which the standard fully connected layer is added, to combine the features of different bands. The CNN can be used for processing a representation where the same pattern can appear at any position in the representation. In some types of audio data, however, different patterns appear in different frequency bands. For this reason, a limited weight sharing scheme (e.g., sharing same weights 412) may be suitable. The difference is that a different (not shared) kernel can be used for different frequency windows in the convolution layer. Each node 408 in the pooling layer summarizes the convolution layer's activations generated from particular feature maps 410 defined by the kernels. It is as if the convolution and pooling layers are divided into many sections, each of which processes only a limited range of the input bands and generates only one output band in the pooling layer.

This scheme helps reduce the number of nodes in the pooling layer. Because each band uses kernels that consider only patterns appearing in the corresponding frequency range, the number of kernels per band is reduced and the resulting representation has a better ability to distinguish patterns in different frequency bands. On the other hand, this limited weight sharing scheme has the disadvantage of preventing the addition of more convolution layers on top of the others. This is because the features in different pooling layer bands in this scheme are unrelated and may not be convolved. Another solution is to apply the limited weight sharing convolution layer on top of a full weight sharing one.

Therefore, a system that implements CNNs can model specific activations at various locations in a representation (e.g., time, feature type) that would map a particular representation with a predicted type of day (e.g., weekend day, sick day). A fully trained model could then be used to quickly detect an anomalous event based on, for example, sounds of unexpected activities, absence of sounds of expected activity, or sounds of activities indicative of an individual experiencing an anomalous event. For example, the captured sounds can identify a health hazard condition such as an acute emergency or a pattern indicative of an unhealthy state of an individual.

In some embodiments, detection of an activation or patterns of activations (or failure thereof) can trigger a communication to a caregiver such as a nurse or family member to report a detected incident. For example, a monitoring device may establish a communications link over a computer or cellular network to an electronic device accessible by a caregiver. The monitoring device can then communicate an alert to the caregiver about a detected incident. For example, the caregiver's smartphone may receive an SMS text message alerting the caregiver that the monitoring device detected that the monitored individual has fallen and needs assistance. Unlike prior systems, this entire process could be automated to operate in a transparent manner that avoids needing the monitored individual to explicitly request emergency assistance from a caregiver.

Some benefits of this system include a significant reduction in complexity and cost, with a simultaneous increase in sensing fidelity. For example, the system can be implemented on an inexpensive single-board LINUX computer, and requires minimal setup and installation. Such a system could be implemented on existing smart-speaker devices (e.g., GOOGLE HOME, AMAZON ECHO).

Figure 5:
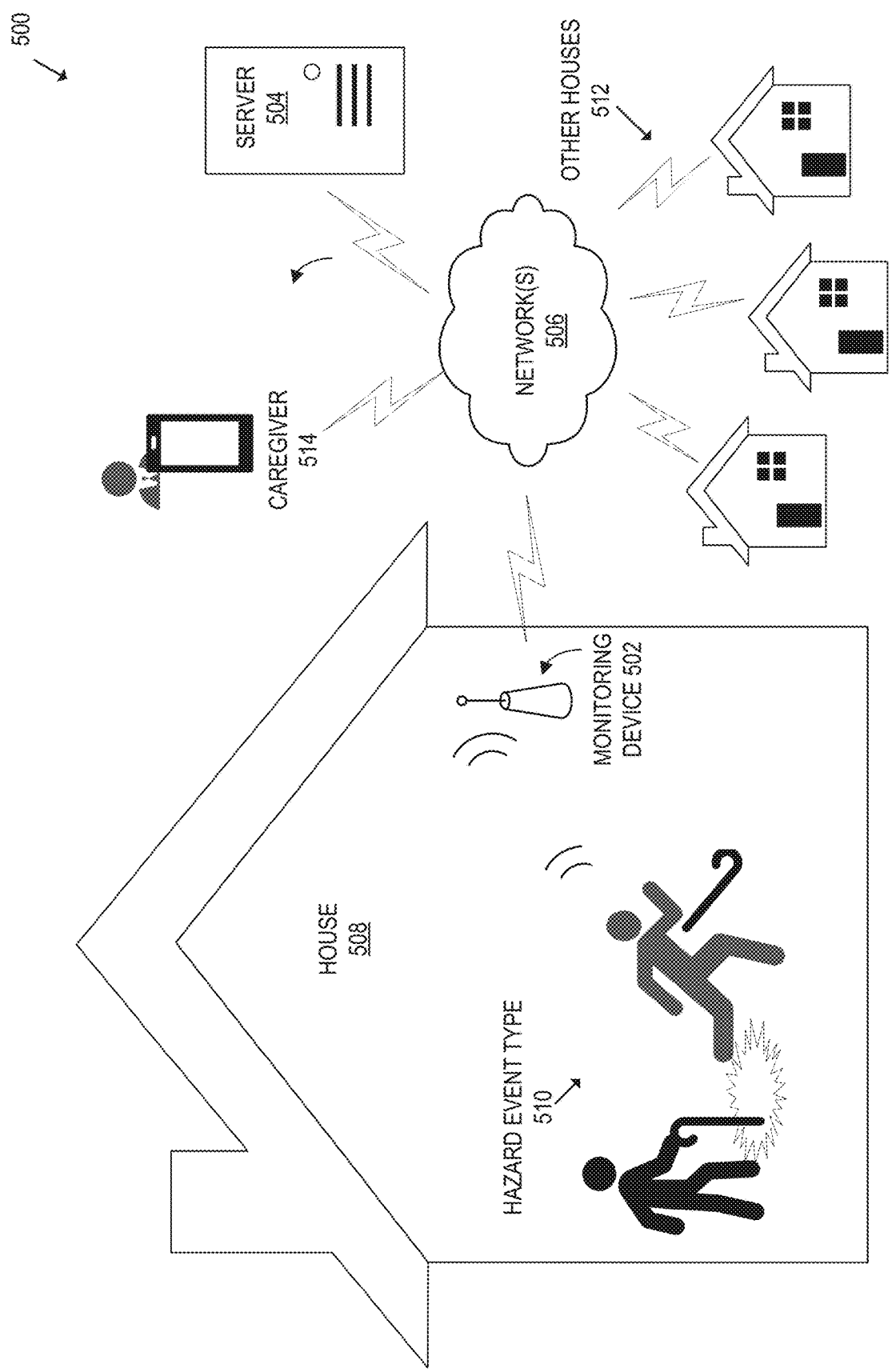
FIG. 5 is a block diagram that illustrates an example of a system in which aspects of the disclosed technology can be embodied.

FIG. 5 is a block diagram that illustrates an example of a system 500 in which aspects of the disclosed technology can be embodied. The system 500 includes a monitoring device 502 that is communicatively coupled to a remote server 504 over network(s) 506. The monitoring device 502 is placed in a house 508 to monitor and identify a hazard event type 510, which is a slip and fall of the monitored user in this example. In the illustrated example, the system 500 includes numerous other houses 512 that monitor respective users.

The monitoring device 502 is configured to monitor activity of the user in an area of a house. In some embodiments, the monitoring device 502 includes electronic components such as a microphone configured to capture sounds originating in the area of the house, a network interface, a processor, o/rand a memory including software instructions that, when executed by the processor, cause the monitoring device 502 to detect hazard events. For example, the monitoring device 502 can generate audio data based on sounds captured by the microphone in the area of the house 508. The monitoring device 502 can generate a set of audio event labels by processing the audio data with pattern recognition model(s) that are capable of detecting predefined audio patterns based on the audio data.

The monitoring device 502 can identify a hazard event type occurring at a point in time in the area by processing the set of audio event labels with a hazard detection model that is configured to identify hazard event types. In response to detecting a hazard event type, a network interface of the monitoring device 502 can communicate an indication of the hazard event type over a network to a caregiver 514's electronic communications device remotely located from the house 508 over the network 506. For example, electronic communications device associated with the caregiver 514 may be authorized by the user to receive notifications from the monitoring device 502 or the server 504. Thus, the monitoring device 502 and/or server 504 can individually or collectively identify a hazard event indicative of a person needing assistance, and then notify the caregiver 514 of the need for assistance.

In some embodiments, components of the system 500 can collectively obtain pattern recognition models (e.g., classifiers) capable of identifying predefined patterns based on audio data. The system 500 generates audio event labels by processing the audio data with the pattern recognition models, and then trains a hazard detection model based on the audio event labels relative to predefined hazard events. A hazard detection model is trained to identify hazard events occurring in a predefined time period based on input of audio-based data generated by the monitoring device. The monitoring devices of the house 508 and the other houses 512 collectively capture sounds in their respective locations.

In some embodiments, the audio data is a data stream generated in real-time or near real-time based on the sounds captured by the microphone of the monitoring device. The server 504 is communicatively coupled to the monitoring device 502 over the network(s) 506. The server 504 includes a transceiver configured to receive a representation of audio event labels over the network 506 from a transceiver of the monitoring device 502. The server 504 can train the hazard detection model based on the data provided from the house 508 and the other houses 512.

Thus, the system 500 trains pattern recognition models based on audio data of known devices and known event types. The audio data is indicative of sounds of activities occurring in an environment (e.g., room or area of a house). For example, the activities can be physical household activities (e.g., verbal or non-verbal activities). The system 500 can generate a baseline of audio event labels with the trained pattern recognition models. In some embodiments, the output is a representation of the audio signals (e.g., spectrograph of activations). In some embodiments, the representation is the output of a convolutional neural network trained on audio data. In some embodiments, the representation is generated at the monitoring device 502 while any analysis for detecting anomalous activity is performed at the remote server 504. As such, there is no need to communicate the actual captured sounds over the computer network from the local device to the remote computer system, which maintains the individual's privacy. Instead, only the representation (or a portion thereof) would need to be communicated over the computer network in this embodiment.

The system 500 can train a hazard detection model based on samples of known hazard events and associated audio event labels. For example, a hazard event such as a fall could have associated audio event labels such as a thump sound, followed by screaming or crying sounds all occurring within a certain time period. The hazard detection model can process representations of audio data with a CNN, another type of neural network, etc. The system can compare the representation processed by the CNN to a baseline representation to detect differences as possible anomalies. In some embodiments, a current representation spans a first timeframe (e.g. a day) and the baseline representation spans a second timeframe equal to or greater than the first timeframe.

The system 500 can detect an anomalous event (e.g., health hazard condition) based on a pattern of audio event labels that are generated in real-time or near real-time from audio data produced from sounds of in-home activities. In some embodiments, the system can also identify an anomalous event. Identifying an anomalous event may include classifying recognized activities in classes such that the identification of the anomalous event is based on an anomalous pattern of the classified activities. The anomalous event may be, for example, an unexpected physical activity occurring during a time segment or failure to recognize an expected physical activity during the time segment.

As such, the pattern of audio event labels may be indicative of contextual information that can be utilized to readily detect a hazard condition. The pattern may include a sequence of audio event labels over a range of time that is compared to a baseline or expected sequence of audio event labels of a similar range of time. In another example, a cluster of a combination of audio event labels could be used to detect or identify a health hazard condition. For example, a cluster of audio event labels indicative of falling, followed by screaming and crying may be indicative of a health hazard condition. In some embodiments, an anomalous event is identified based on a failure to identify an expected activity indicated in a baseline pattern of activities selected from multiple baseline patterns. The different baseline patterns may be indicative of a regular day, a sick day, a weekday, a weekend, etc.

Figure 6:
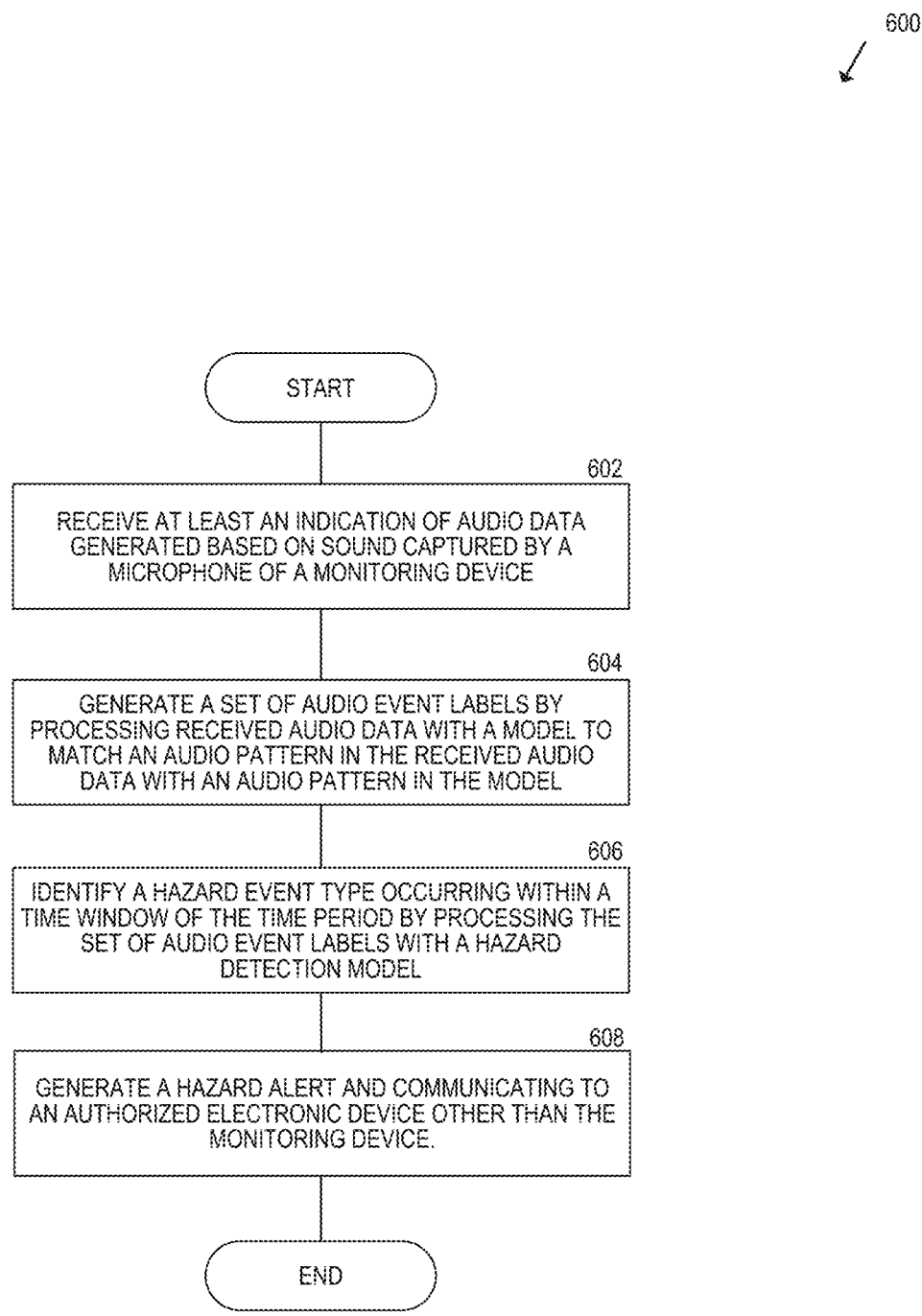
FIG. 6 is a flowchart that depicts processes 600 including methods for handling an anomalous event based on recognized in-home activities.

FIG. 6 is a flowchart that depicts processes 600 including methods for handling an anomalous event based on recognized in-home activities. In 602, the system can receive audio data or an indication of audio data generated by a monitoring device based on sound captured by a microphone of the monitoring device. The sound is captured of an area being monitored over a time period.

In 604, the system can generate a set of audio event labels by processing the received audio data with a model (e.g., a classifier model) that includes audio recognition patterns. In one example, at least some of the set of audio event labels are indicative of non-verbal event types. In another example, a first audio event label is indicative of verbal activity and a second audio event label is indicative of non-verbal activity. The model can recognize audio patterns based on audio data or an indication thereof. The audio event labels are each generated by matching an audio pattern in the received audio data with an audio pattern of the model. In some embodiments, the system processes audio data of sequential or overlapping time windows in the time period to identify audio event labels.

In 606, the system identifies a hazard event type occurring within a time window of the time period by processing the set of audio event labels with a hazard detection model. The hazard detection model can identify any of numerous hazard event types based on, in addition to the set of audio event labels, a time of day associated with the time window, monitoring devices detecting hazard events in the time window, a temperature reported by a temperature sensor of the monitoring device, a contextual location of the monitoring device, and/or a dual set of audio event labels generated based on sound captured from microphones of numerous monitoring devices. Examples of the contextual location include a living room, a bathroom, or a bedroom of a house monitored by the monitoring device.

The system can output an indication of the anomalous event. For example, the system can cause communication of a notification to a remote computing device. The notification may include an indication of the anomalous event. For example, in 608, in response to detecting the hazard event type, the system can generate a hazard alert and communicate at least an indication of the hazard alert to an electronic device other than the monitoring device. The electronic device or its user (e.g., caregiver) is authorized to receive communications from the monitoring device. In some embodiments, the hazard alert is generated by detecting or matching a pattern of the set of audio event labels to one of many hazard event types by processing the audio data with a convolutional neural network. In some embodiments, a detected pattern is an anomalous pattern of the set of audio event labels. Specifically, the detected pattern is compared to a baseline pattern of audio event labels. The detected pattern can span a first timeframe and the baseline pattern can span a second timeframe equal to or greater than the first timeframe.

In some embodiments, the hazard alert is generated when the system fails to identify an expected event type at all or at an expected point in time relative to a baseline pattern. In some embodiments, the hazard alert is generated in response to generating audio event labels, which is performed substantially (e.g., mostly) synchronously to a confirmation that generation of the set of audio events is successful. The hazard alert can indicate various conditions to emergency services or a caregiver of the user. For example, the hazard alert can indicate that an event type occurred unexpectedly, or that an event type occurred in one time segment but was expected to occur in another time segment.

The aforementioned processes 600 can be performed entirely by a standalone portable monitoring device or by a combination of the monitoring device and a remotely located server computer communicatively coupled over a network. In some embodiments, the processes are performed by multiple interconnected portable monitoring devices distributed in different rooms or areas of a house, etc.

Figure 7:
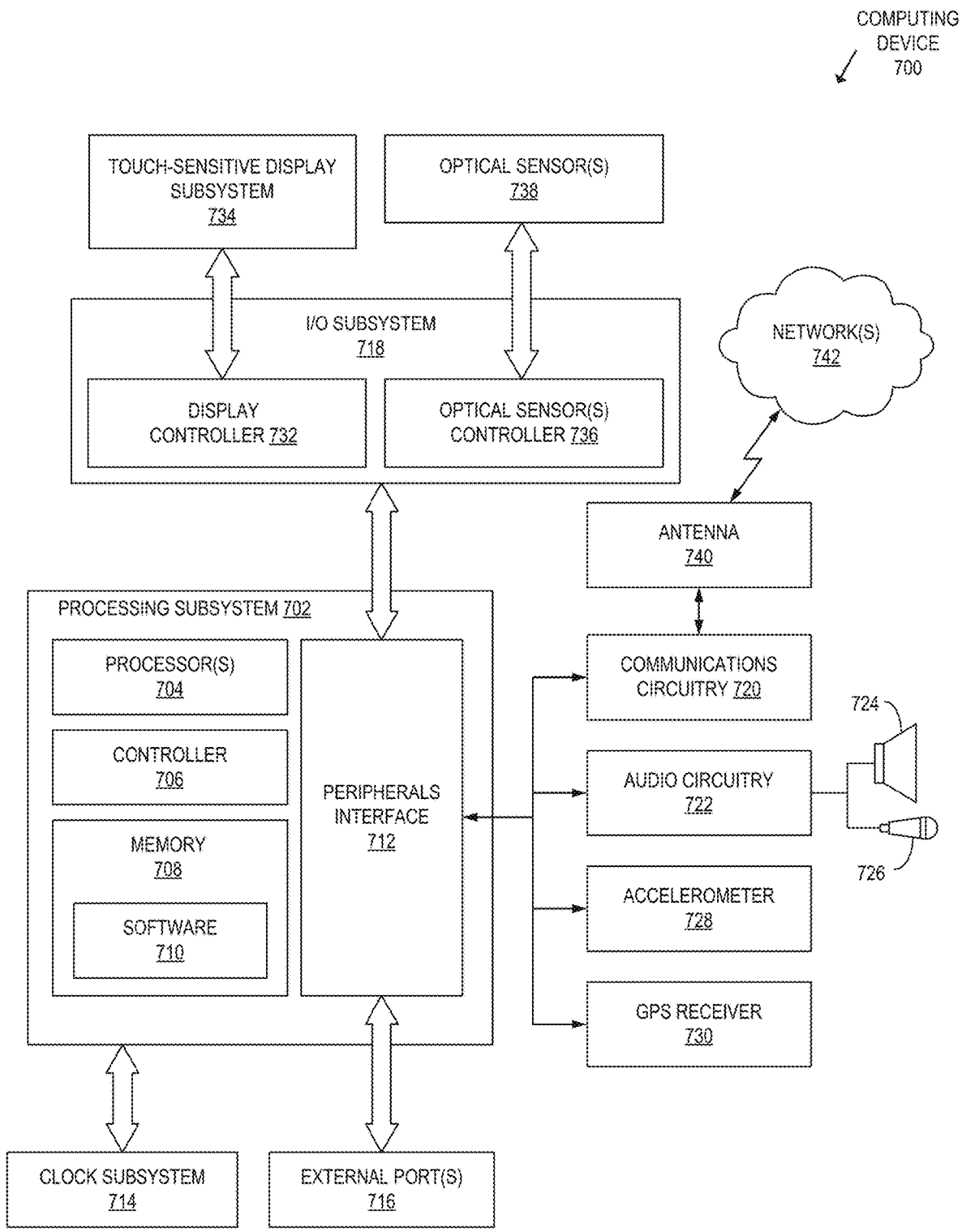
FIG. 7 is a block diagram illustrating an example of a computing device in which aspects of the disclosed technology can be embodied.

FIG. 7 is a block diagram illustrating an example computing device in which aspects of the disclosed technology can be embodied. For example, the disclosed system or monitoring device may be hosted on one or more of the computing device 700. The computing device 700 may include generic components and/or components specifically designed to carry out the disclosed technology. The computing device 700 may be a standalone device or part of a distributed system that spans networks, locations, machines, or combinations thereof. For example, components of the computing device 700 may be included in or coupled to a system-on-chip (SOC), a single-board computer (SBC) system, a desktop or laptop computer, a kiosk, a mainframe, a mesh of computer systems, or combinations thereof.

In some embodiments, the computing device 700 can operate as a server device or a client device in a client-server network environment, or as a peer machine in a peer-to-peer system. In some embodiments, the computing device 700 may perform one or more steps of the disclosed embodiments in real-time, near real-time, offline, by batch processing, or combinations thereof.

The computing device 700 includes a processing subsystem 702 that includes one or more processors 704 (e.g., central processing units (CPUs), application specific integrated circuits (ASICs), and/or field programmable gate arrays (FPGAs)), a memory controller 706, memory 708 that can store software 710, and a peripherals interface 712. The memory 708 may include volatile memory (e.g., random-access memory (RAM)) and/or non-volatile memory (e.g., read-only memory (ROM)). The memory 708 can be local, remote, or distributed. The computing device 700 can also include a clock subsystem 714 that controls a timer for use in some embodiments. The components of the computing device 700 are interconnected over a bus (not shown) operable to transfer data between hardware components.

The peripherals interface 712 is coupled to one or more external ports 716 which can connect to an external power source, for example. The peripherals interface 712 is also coupled to an I/O subsystem 718. Other components coupled to the peripherals interface 712 include communications circuitry 720, audio circuitry 722 for a speaker 724 and a microphone 726, an accelerometer 728, a GPS receiver 730 (or global navigation satellite system (GLONASS) or other global navigation system receiver), and other sensors (not shown). The GPS receiver 730 is operable to receive signals concerning the geographic location of the computing device 700. The accelerometer 728 can be operable to obtain information concerning the orientation (e.g., portrait or landscape) of the computing device 700.

The I/O subsystem 718 includes a display controller 732 operative to control a touch-sensitive display system 734, which further includes the touch-sensitive display of the computing device 700. The I/O subsystem 718 also includes an optical sensor(s) controller 736 for one or more optical sensors 738 of the computing device 700. The I/O subsystem 718 includes other components (not shown) to control physical buttons.

The communications circuitry 720 can configure the antenna 740 of the computing device 700. In some embodiments, the antenna 740 is structurally integrated with the computing device 700 (e.g., embedded in the housing or display screen) or coupled to the computing device 12 through the external ports 716. The communications circuitry 720 can convert electrical signals to/from electromagnetic signals that are communicated by the antenna 740 to networks 742 or other devices. For example, the communications circuitry 720 can include radio frequency (RF) circuitry that processes RF signals communicated by the antenna 740.

The communications circuitry 720 can include circuitry for performing well-known functions such as an RF transceiver, one or more amplifiers, a tuner, oscillators, a digital signal processor, a CODEC chipset, a subscriber identity module (SIM card or eSIM), and so forth. The communications circuitry 720 may communicate wirelessly via the antenna 740 with the networks 742 (e.g., the Internet, an intranet and/or a wireless network, such as a cellular network, a wireless local area network (LAN) and/or a metropolitan area network (MAN)) or other devices.

The software 710 can include an OS software program, application software programs, and/or modules. For example, a GPS module can determine the location of the computing device 700 based on the GPS signals received by the GPS receiver 730. The GPS module can provide this information to components of the computing device 700 for use in various applications (e.g., to provide location-based contextual information).

A software program, when referred to as "implemented in a computer-readable storage medium," includes computer-readable instructions stored in the memory (e.g., memory 708). A processor (e.g., processor 704) is "configured to execute a software program" when at least one value associated with the software program is stored in a register that is readable by the processor. In some embodiments, routines executed to implement the disclosed embodiments may be implemented as part of OS software (e.g., MICROSOFT WINDOWS and LINUX) or a specific software application, component, program, object, module, or sequence of instructions referred to as "computer programs."

Computer programs typically comprise one or more instructions set at various times in various memory devices of the computing device 700, which, when read and executed by the processor 704, will cause the computing device 700 to execute functions involving the disclosed embodiments. In some embodiments, a carrier containing the aforementioned computer program product is provided. The carrier is one of an electronic signal, an optical signal, a radio signal, or a non-transitory computer-readable storage medium (e.g., the memory 708).

Operation of the memory 708, such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

The computing device 700 may include other components that are not shown nor further discussed herein for the sake of brevity. One having ordinary skill in the art will understand any hardware and software that is included but not shown in FIG. 7. While embodiments have been described in the context of fully functioning computing devices, those skilled in the art will appreciate that the various embodiments are capable of being distributed as a program product in a variety of forms and that the disclosure applies equally, regardless of the particular type of machine or computer-readable media used to actually effect the embodiments.

The foregoing description of various embodiments of the subject matter has been provided for the purposes of illustration and description. It is not intended to be exhaustive or to limit the subject matter to the precise forms disclosed. Many modifications and variations will be apparent to one skilled in the art. Embodiments were chosen and described in order to best describe the principles of the invention and its practical applications, thereby enabling those skilled in the relevant art to understand the embodied subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by this disclosure. Particular terminology used when describing certain features or aspects of various embodiments should not be taken to imply that the terminology is being redefined herein to be restricted to any specific characteristics, features, or aspects of the technology with which that terminology is associated. In general, the terms used in the following embodiments should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The invention claimed is:

1. A method comprising:
receiving at least an indication of audio data generated based on sound captured by a microphone of a monitoring device, the captured sound being of activity of a user being monitored in an area over a time period;
generating a set of audio event labels by processing the received audio data with a model that includes a plurality of audio recognition patterns, the model being capable of recognizing audio patterns based on audio data or an indication of audio data, and each audio event label being generated by matching an audio recognition pattern in the received audio data with an audio recognition pattern of the plurality of audio recognition patterns;
identifying a hazard event type occurring within a time window of the time period by:
processing the set of audio event labels with a hazard detection model including a baseline of audio event labels for activities of the user in the area, and
detecting an anomalous event during the time window based on a deviation between the set of audio event labels and the baseline of audio event labels,
wherein the anomalous event indicates an unexpected activity or a failure to detect an expected activity; and
in response to identifying the hazard event type with the hazard detection model, generating a hazard alert and communicating at least an indication of the hazard alert to an electronic device other than the monitoring device, the electronic device being authorized to receive communications from the monitoring device.

2. The method of claim 1, wherein the monitoring device is a home monitoring device and the hazard event type is a health hazard event type.

3. The method of claim 1, wherein the processing of the received audio data comprises:
processing audio data of sequential or overlapping time windows in the time period.

4. The method of claim 1, wherein the hazard detection model is configured to identify any of a plurality of hazard event types based on, in addition to the set of audio event labels:
a time of day associated with the time window;
a plurality of monitoring devices detecting hazard events in the time window;
a temperature reported by a temperature sensor of the monitoring device;
a contextual location of the monitoring device; or
a dual set of audio event labels generated based on sound captured from a plurality of microphones of a plurality of monitoring devices.

5. The method of claim 4, wherein the contextual location includes a living room, a bathroom, or a bedroom of a house being monitored by the monitoring device.

6. The method of claim 1, wherein the hazard alert is generated in response to generating the set of audio event labels, which is performed substantially synchronously to a confirmation that generation of the set of audio events is successful.

7. The method of claim 1, wherein generating the hazard alert comprises:
matching a pattern in the set of audio event labels to the hazard event type from among a plurality of hazard event types by processing received audio data with a convolutional neural network.

8. The method of claim 1, wherein the hazard alert indicates that the event type occurred in the time window but was expected in a different time window of the time period.

9. The method of claim 1, wherein the hazard alert indicates that the event type occurred unexpectedly in the time window.

10. The method of claim 1, wherein at least some of the set of audio event labels are indicative of non-verbal event types.

11. The method of claim 1, wherein a first audio event label is indicative of verbal activity and a second audio event label is indicative of non-verbal activity.

12. The method of claim 1, wherein generating the hazard alert comprises:
detecting a pattern in the set of audio event labels as any of a plurality of hazard event types; and
outputting the hazard alert, wherein the detected pattern is an anomalous pattern of the set of audio event labels.

13. The method of claim 1, wherein generating the hazard alert comprises:
detecting a pattern in the set of audio event labels; and
comparing the detected pattern of the set of audio event labels to a baseline pattern of audio event labels.

14. The method of claim 13, wherein the detected pattern spans a first timeframe and the baseline pattern spans a second timeframe equal to or greater than the first timeframe.

15. The method of claim 1, wherein generating the hazard alert comprises:
failing to recognize an event type at an expected point in time relative to a baseline pattern of audio event labels.

16. The method of claim 1, wherein the hazard alert is detected based on a failure to identify an expected event type in a baseline pattern of audio event labels selected from a plurality of baseline patterns of audio event labels.

17. A system comprising:
one or more processors; and one or more memories including instructions that, when executed by the processors, cause the system to:
    obtain a plurality of pattern recognition models capable of identifying predefined patterns based on audio data;
    obtain audio data generated by a monitoring device based on sounds captured by a microphone of the monitoring device, the captured sounds being of activity of a user being monitored in an area over a predefined time period;
    generate a set of audio event labels by processing the audio data with the plurality of pattern recognition models; and
    train a hazard detection model based on the set of audio event labels relative to predefined hazard events, wherein the hazard detection model is trained to identify a plurality of hazard events occurring in the predefined time period based on input of audio-based data generated by the monitoring device;
    identify a hazard event type occurring within the predefined time period by causing the system to:
        process the set of audio event labels with the hazard detection model including a baseline of audio event labels for activities of the user in the area, and
        detect an anomalous event during the predefined time period based on a deviation between the set of audio event labels and the baseline of audio event labels,
            wherein the anomalous event indicates an unexpected activity or a failure to detect an expected activity.

18. The system of claim 17, wherein the monitoring device is a portable home monitoring device configured to capture sounds in a room or area of a house.

19. The system of claim 18 further comprising:
    a server computer comprising:
        a transceiver configured to receive a representation of the set of audio event labels over a network from a transceiver of the monitoring device; and
        a processor configured to train the hazard detection model.

20. The system of claim 19, wherein the representation is a graphical representation of sound captured by the monitoring device over a designated time period.

21. The system of claim 17 further comprising:
    a server computer communicatively coupled to the monitoring device over a network, the server computer including at least some of the one or more processors and the one or more memories.

22. The system of claim 17, wherein the monitoring device is a first monitoring device, the system further comprising:
    a plurality of monitoring devices including the first monitoring device, wherein each monitoring device includes a microphone configured to capture sounds in a respective location of the monitoring device.

23. The system of claim 17, wherein the audio data is a stream of audio data generated in real-time or near real-time based sounds based on the sounds captured by the microphone of the monitoring device.

24. A monitoring device configured to monitor physical activity of a user in an area of a house, the monitoring device comprising:
    a microphone configured to capture sounds created in the area of the house;
    a network interface;
    a processor; and
    a memory including instructions that, when executed by the processor, cause the monitoring device to:
        generate audio data based on sounds captured by the microphone in the area of the house, the captured sounds being of activity of a user being monitored in the area of the house;
        generate a set of audio event labels by processing the audio data with a plurality of pattern recognition models, the plurality of pattern recognition models being capable of detecting predefined audio patterns based on the audio data;
        identify a hazard event type occurring at a point in time in the area by processing the set of audio event labels with a hazard detection model that is configured to identify a plurality of hazard event types by causing the monitoring device to:
            process the set of audio event labels with a hazard detection model including a baseline of audio event labels for activities of the user in the area of the house, and
            detect an anomalous event during the point in time based on a deviation between the set of audio event labels and the baseline of audio event labels,
                wherein the anomalous event indicates an unexpected activity or a failure to detect an expected activity; and
        in response to detecting the hazard event type, causing the network interface to communicate at least an indication of the hazard event type over a network to an emergency service or to an electronic communications device remotely located from the house.

25. The monitoring device of claim 24, wherein the electronic communications device is associated with a caregiver of the user, the caregiver being authorized by the user to receive notifications from the monitoring device.

* * * * *